United States Patent Office 3,235,602
Patented Feb. 15, 1966

3,235,602
ACETYLENIC KETONES AND METHODS
OF PREPARATION
James P. Russell, Scotch Plains, N.J., assignor to Air
Reduction Company, Incorporated, New York, N.Y.,
a corporation of New York
No Drawing. Filed Mar. 5, 1962, Ser. No. 177,218
7 Claims. (Cl. 260—596)

This invention relates to acetylenic ketones and the preparation of acetylenic ketones and is more particularly concerned with a catalytic process for preparing acetylenic ketones from acetylenic glycols.

It is an object of this invention to provide acetylenic ketones and an improved method and process for the preparation of these acetylenic ketones.

A further object is to provide a vapor phase catalytic process for producing acetylenic ketones from acetylenic glycols.

A still further object is to provide catalysts useful for promoting the vapor phase dehydration of acetylenic glycols.

These and other objects, as well as other advantages of this invention will become apparent in the following description.

In accordance with the invention an acetylenic ketone or ethynyl ketone is prepared by a catalytic vapor phase dehydration of an acetylenic glycol.

The acetylenic glycols useful in the practice of this invention are represented by the formula:

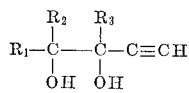

wherein $R_1$, $R_2$, and $R_3$ are alkyl radicals containing from 1 to 6 carbon atoms, and where the total number of carbon atoms in $R_1$, $R_2$, and $R_3$ does not exceed twelve. Among the acetylenic glycols which may be utilized in the present invention are:

3,4-dimethyl-1-pentyne-3,4-diol;
3,4-dimethyl-1-hexyne-3,4-diol;
3,4-dimethyl-1-heptyne-3,4-diol;
3,4-dimethyl-1-octyne-3,4-diol;
3-methyl-4-ethyl-1-pentyne-3,4-diol;
3-ethyl-4-methyl-1-pentyne-3,4-diol;
3,4-diethyl-1-pentyne-3,4-diol;
3,4-diethyl-1-octyne-3,4-diol;
3-methyl-4-ethyl-1-heptyne-3,4-diol;
3-butyl-4-methyl-1-pentyne-3,4-diol;
3,4-dibutyl-1-octyne-3,4-diol;
3-methyl-4-ethyl-1-hexyne-3,4-diol;
3,4,6-trimethyl-1-heptyne-3,4-diol; and
3,4-dimethyl-1-decyne-3,4-diol.

The vapor phase dehydration reaction of the acetylenic glycol may be represented by the following equation:

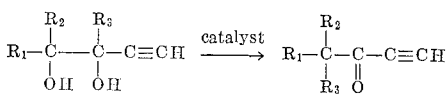

Representative of the acetylenic ketones prepared by the procedures of this invention are:

4,4-dimethyl-1-pentyne-3-one;
4,4-dimethyl-1-hexyne-3-one;
4,4-dimethyl-1-heptyne-3-one;
4,4-dimethyl-1-octyne-3-one;
4-methyl-4-ethyl-1-hexyne-3-one;
4-methyl-4-ethyl-1-heptyne-3-one;
4,4,6-trimethyl-1-heptyne-3-one; and
4,4-dimethyl-1-decyne-3-one.

In general, the acetylenic glycol is vaporized. The vaporized glycol is then heated to the desired reaction temperature and then passed over the dehydration catalyst. The catalyst is maintained by suitable heating means at the desired reaction temperature. Conventional equipment and procedures are used for vaporizing and heating the acetylenic glycol, and are used for maintaining the solid catalyst bed at the reaction temperature. Useful is a catalyst bed maintained in a reactor, with a bed of inert materials on top of the catalyst bed. The reactor is inserted into any suitable heating means. The heated inert bed heats the acetylenic glycol vapors, before the glycol reaches the catalyst bed. The materials that have passed over the catalyst are condensed and the product acetylenic ketone is recovered by any suitable method, from the condensed materials. Distillation is a useful technique for recovering the product ketone. Unreacted glycol may also be recovered by distillation.

The catalysts useful in this invention are dehydration catalysts. Suitable catalysts include alumina, silica, thorium oxide (thoria), chromic oxide (chromia), tungstic oxide (tungsten trioxide); phosphoric acid on carbon or inert support, sulfuric acid on carbon or inert support, and similar dehydration catalysts.

In the practice of this invention, the heated vaporized acetylenic glycol and the catalyst are maintained within a reaction temperature range of 200° C. to 400° C. for satisfactory results. It is also generally desirable to use high space velocities of the glycol over the catalyst bed. Short catalyst contact time results in smaller amounts of by-products or less side reactions. The reaction is usually conducted at atmospheric pressure, although superatmospheric or subatmospheric pressures may be used.

The following Examples 1 to 5 are illustrative of the procedures and techniques of this invention.

*Example 1*

A cylindrical tube reactor had the bottom portion packed with 63 grams of alumina. The alumina contained more than 99% $Al_2O_3$. The upper portion of the tube reactor was then packed with glass beads. The tube reactor was then inserted in a tube furnace. The feed material, 3,4-dimethyl-1-pentyne-3,4-diol, was vaporized and passed to the tube reactor. The vaporized feed material passed down through the glass beads, where it was preheated, and then through the catalyst bed of alumina. The product materials from the tube reactor were condensed in a conventional condensing system.

A run was made where the catalyst bed of alumina was maintained at 250° C. The 3,4-dimethyl-1-pentyne-3,4-diol was passed through the catalyst bed at a rate of 50 grams per hour. A total of 176 parts of the 3,4-dimethyl-1-pentyne-3,4-diol was passed through the reactor. Recovered in the condensing system were 167 parts of product materials. The product materials were distilled, using a 25 plate column. Distillation gave 60 parts of a low boiling fraction and 88 parts of a high boiling fraction. Seventy-six parts of the starting material, 3,4-dimethyl-1-pentyne-3,4-diol, were recovered from the high boiling fraction. The low boiling fraction contained 32.4 parts of 4,4-dimethyl-1-pentyne-3-one. The calculated yield was 36%; while the conversion was 21.4%.

Another run was made, operating under conditions substantially the same as in the previously described run. The feed material flow rate was 920 grams per hour. Refractionation of the low boiling fraction, gave 4,4-dimethyl-1-pentyne-3-one, boiling point, 116° C.; $n_D^{20}$, 1.4190. Calculated for 4,4-dimethyl-1-pentyne-3-one: —C≡CH, 22.2%; =C=O, 25.4%. Found: —C≡CH, 20.4%; =C=O, 24.8%. The semicarbazone of the refractionated material had a melting point of 133°–136° C.

Total hydrogenation of 42 grams of the refractionated material required 0.73 mole of hydrogen, indicating a molecular weight of 116. The semicarbazone of the hydrogenated material had a melting point of 145.2°–145.5° C., corresponding to ethyl t-butyl ketone or 4,4-dimethyl pentane-3-one.

*Example 2*

Utilizing the procedures and apparatus of Example 1, 4,4-dimethyl-1-heptyne-3-one is prepared from 3,4-dimethyl-1-heptyne-3,4-diol. The cylindrical tube reactor is packed with 80 grams of silica. The catalyst bed of silica is maintained at a temperature of 300° C. The feed material 3,4-dimethyl-1-heptyne-3,4-diol, is vaporized and passed through the catalyst bed. The flow rate of feed material through the catalyst bed is 115 grams per hour. Reaction products are recovered in the condensing system. Distillation and refractionation are utilized to recover the 4,4-dimethyl-1-heptyne-3-one from the reaction products. Unreacted feed material is also recovered. The yield of 4,4-dimethyl-1-heptyne-3-one is about 50%, with good conversion.

*Example 3*

Operating under the procedures of Example 1, 4-methyl - 4 - ethyl - 1 - hexyne-3-one is prepared from 3-methyl-4-ethyl-1-hexyne-3,4-diol. The catalyst is sulfuric acid on carbon. Catalyst bed temperature is maintained at 300° C. The flow rate of feed material over the catalyst bed is 500 grams per hour. The product 4-methyl-4-ethyl-1-hexyne-3-one is recovered from the crude product mixture. The yield and conversion are satisfactory.

*Example 4*

Using the procedure of Example 1, 4,4,6-trimethyl-1-heptyne - 3 - one is prepared from 3,4,6 - trimethyl - 1-heptyne-3,4-diol. The catalyst is thorium oxide (thoria). The catalyst bed is maintained at a temperature of 400° C. The product 4,4,6-trimethyl-1-heptyne-3-one is recovered by distillation. The yield is 70%.

*Example 5*

Operating with the procedures and apparatus previously described, 4,4-dimethyl-1-decyne-3-one is prepared by passing vaporized 3,4-dimethyl-1-decyne-3,4-diol over a catalyst bed of phosphoric acid on carbon. Catalyst bed temperature is maintained at 380° C. The product acetylenic ketone is recovered from the reaction product mixture. Yield and conversion are satisfactory.

The acetylenic ketones prepared by the described procedures of this invention are useful as corrosion stabilizers or inhibitors for chlorinated solvents as trichloroethylene; and are useful as corrosion inhibitors for metals in the presence of aqueous acid solutions as pickling or plating baths. For these purposes the acetylenic ketones are suitably used in concentrations of about 1% by weight of the solvent or bath solution. The acetylenic ketones are also useful as agents in treating soil or growth media to disinfect the soil and provide improved plant growth. For this application the acetylenic ketone is dispersed in water or any suitable solvent and applied to the growth medium in an amount of about 50 parts by weight per million parts by weight of the medium.

The acetylenic glycols useful in the practice of this invention may be prepared by known methods. For example, an hydroxy ketone may be reacted with sodium acetylide in liquid ammonia. This reaction gives the acetylenic glycol. The hydroxy ketones may be prepared by the hydration of acetylenic alcohols, using mercuric sulphate as a catalyst. The acetylenic alcohols may be prepared by the reaction of ketones with sodium acetylide or sodium alkyl acetylides in liquid ammonia.

While preferred embodiments of this invention have been described, it is to be understood that widely different modifications of the invention may be made without departing from the scope and spirit of the invention. The invention is not to be limited by the foregoing examples and details of description except as defined by the following claims.

I claim:

1. A process of producing acetylenic ketones having the general formula

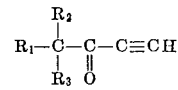

which comprises contacting an acetylenic glycol in the vapor phase with a solid bed of a dehydration catalyst at a temperature of from about 200° C. to about 400° C., and where the acetylenic glycol has the general formula:

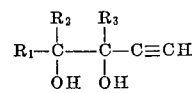

wherein $R_1$, $R_2$, and $R_3$ are alkyl radicals and where the total number of carbon atoms in $R_1$, $R_2$, and $R_3$ does not exceed twelve.

2. The method of producing acetylenic ketones having the general formula:

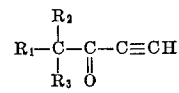

wherein $R_1$, $R_2$, and $R_3$ are alkyl radicals containing from 1 to 6 carbon atoms and where the total number of carbon atoms in $R_1$, $R_2$, and $R_3$ does not exceed twelve which comprises vaporizing an acetylenic glycol having the general formula:

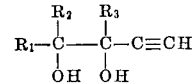

wherein $R_1$, $R_2$, and $R_3$ are alkyl radicals containing from 1 to 6 carbon atoms and where the total number of carbon atoms in $R_1$, $R_2$, and $R_3$ does not exceed twelve and contacting said vaporized glycol with a solid bed of a dehydration catalyst at a temperature of from about 200° C. to about 400° C.

3. The method according to claim 1 wherein the dehydration catalyst is alumina.

4. The method according to claim 1 wherein the dehydration catalyst is silica.

5. The method according to claim 1 wherein the dehydration catalyst is thorium oxide.

6. A process which comprises contacting an acetylenic glycol in the vapor phase with a solid bed of a dehydration catalyst at a temperature of from about 200° C. to about 400° C., and where the acetylenic glycol has the general formula:

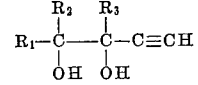

wherein $R_1$, $R_2$, and $R_3$ are alkyl radicals and where the total number of carbon atoms in $R_1$, $R_2$, and $R_3$ does not exceed twelve, said dehydration catalyst being selected from the group consisting of alumina, silica, thoria, chromia, tungsten trioxide, phosphoric acid on carbon, phosphoric acid on an inert support, sulfuric acid on carbon and sulfuric acid on an inert support.

7. The method of producing acetylenic ketones having the general formula:

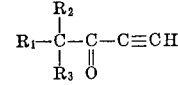

wherein $R_1$, $R_2$, and $R_3$ are alkyl radicals containing from 1 to 6 carbon atoms and where the total number of carbon atoms in $R_1$, $R_2$, and $R_3$ does not exceed twelve which comprises vaporizing an acetylenic glycol having the general formula:

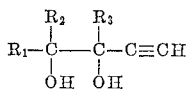

wherein $R_1$, $R_2$, and $R_3$ are alkyl radicals containing from 1 to 6 carbon atoms and where the total number of carbon atoms in $R_1$, $R_2$, and $R_3$ does not exceed twelve and contacting said vaporized glycol with a solid bed of a dehydration catalyst at a temperature of from about 200° C. to about 400° C., said dehydration catalyst being selected from the group consisting of alumina, silica, thoria, chromia, tungsten trioxide, phosphoric acid on carbon, phosphoric acid on an inert support, sulfuric acid on carbon and sulfuric acid on an insert support.

References Cited by the Examiner
UNITED STATES PATENTS
2,905,588  9/1959  Youngson.

OTHER REFERENCES

Wagner et al., Synthetic Organic Chemistry, p. 341 (1953).

Davis et al., J. Am. Chem. Soc., vol. 76, pp. 3477–8 (1954).

Leonard et al., J. Am. Chem. Soc., vol. 81, p. 599 (1959).

LEON ZITVER, *Primary Examiner.*